United States Patent
Nakashima et al.

(10) Patent No.: US 11,007,987 B2
(45) Date of Patent: May 18, 2021

(54) BRAKE OPERATING APPARATUS AND BRAKE SYSTEM

(71) Applicant: Shimano Inc., Osaka (JP)

(72) Inventors: Yasuhiro Nakashima, Osaka (JP); Yasuho Hommoto, Osaka (JP)

(73) Assignee: Shimano Inc., Osaka (JP)

( * ) Notice: Subject to any disclaimer, the term of this patent is extended or adjusted under 35 U.S.C. 154(b) by 66 days.

(21) Appl. No.: 16/416,674

(22) Filed: May 20, 2019

(65) Prior Publication Data

US 2019/0359187 A1    Nov. 28, 2019

(30) Foreign Application Priority Data

May 23, 2018 (JP) .............................. JP2018-099162

(51) Int. Cl.
  *B62L 3/02* (2006.01)
  *B60T 7/08* (2006.01)
  *B62J 45/40* (2020.01)

(52) U.S. Cl.
  CPC .............. *B60T 7/085* (2013.01); *B62L 3/023* (2013.01); *B60Y 2200/13* (2013.01); *B62J 45/40* (2020.02)

(58) Field of Classification Search
  CPC . B62L 3/02; B62L 3/023; B60T 7/085; B60T 7/10; B60T 7/102; B60T 11/16; B60T 13/741
  See application file for complete search history.

(56) References Cited

U.S. PATENT DOCUMENTS

| | | | |
|---|---|---|---|
| 6,253,635 B1* | 7/2001 | Huber | B60T 7/042 267/158 |
| 2003/0080612 A1* | 5/2003 | Riddiford | F16D 48/04 303/115.2 |
| 2007/0193386 A1* | 8/2007 | Fujii | B62M 25/04 74/501.6 |
| 2007/0193388 A1* | 8/2007 | Nakano | B62M 25/08 74/501.6 |
| 2008/0111342 A1* | 5/2008 | Niekerk | B60T 8/329 280/261 |
| 2008/0114519 A1* | 5/2008 | DuFaux | B60T 7/16 701/70 |
| 2010/0170753 A1* | 7/2010 | Castro | B60T 13/741 188/24.22 |
| 2010/0186538 A1* | 7/2010 | Tetsuka | B62M 25/04 74/501.6 |

(Continued)

FOREIGN PATENT DOCUMENTS

| | | |
|---|---|---|
| CN | 205602031 U | 9/2016 |
| CN | 107303938 A | 10/2017 |

(Continued)

*Primary Examiner* — Thomas J Williams
(74) *Attorney, Agent, or Firm* — Global IP Counselors, LLP

(57) ABSTRACT

A brake operating apparatus operates a brake apparatus of a small vehicle including a bicycle. The brake operating apparatus includes a support, an operating member, an electric actuator and an electronic controller. The operating member is provided to the support. The detector is configured to detect information on input to the operating member. The electric actuator is configured to drive the brake apparatus. The electronic controller is configured to control the electric actuator based on a detection result of the detector.

16 Claims, 5 Drawing Sheets

(56) References Cited

U.S. PATENT DOCUMENTS

| | | | | |
|---|---|---|---|---|
| 2010/0194187 A1* | 8/2010 | Howard | ............ | G08C 17/02 |
| | | | | 303/162 |
| 2012/0024639 A1* | 2/2012 | Castro | ............ | B60T 13/741 |
| | | | | 188/24.22 |
| 2013/0180815 A1 | 7/2013 | Dunlap et al. | | |
| 2015/0128798 A1* | 5/2015 | Kariyama | ............ | B62L 3/023 |
| | | | | 92/61 |
| 2015/0203169 A1* | 7/2015 | Nishino | ............ | B62M 25/04 |
| | | | | 74/491 |
| 2016/0061279 A1* | 3/2016 | Kariyama | ............ | B60T 13/745 |
| | | | | 701/70 |
| 2017/0305395 A1* | 10/2017 | Komatsu | ............ | B62L 3/02 |

FOREIGN PATENT DOCUMENTS

| | | | | |
|---|---|---|---|---|
| CN | 107697220 A | 2/2018 | | |
| DE | 102013213413 A1 * | 1/2015 | ............ | B62L 5/20 |
| DE | 102017107388 A1 * | 10/2017 | ............ | B62L 3/02 |
| WO | WO-2004003401 A1 * | 1/2004 | ............ | B60T 13/741 |
| WO | WO-2011120124 A1 * | 10/2011 | ............ | B60L 15/20 |

\* cited by examiner

BRAKE OPERATING APPARATUS AND BRAKE SYSTEM

CROSS-REFERENCE TO RELATED APPLICATIONS

This application claims priority to Japanese Patent Application No. 2018-099162, filed on May 23, 2018. The entire disclosure of Japanese Patent Application No. 2018-099162 is hereby incorporated herein by reference.

BACKGROUND

Technical Field

The present invention generally relates to a brake operating apparatus and a brake system.

Background Information

A small vehicle including a bicycle is provided with a brake system including a brake operating apparatus and a brake apparatus. For example, United States Patent Application Publication No. 2013/0180815 (Patent Literature 1) describes an example of a brake system.

SUMMARY

It is desired that an existing brake apparatus driven by human power should be driven by electric power.

The present invention has been made to solve the problem above and one object is to provide a brake operating apparatus and a brake system that are capable of driving an existing brake apparatus by electric power.

To solve the foregoing problem and achieve the object, in accordance with a first aspect, a brake operating apparatus operates a brake apparatus of a small vehicle including a bicycle. The brake operating apparatus comprises a support, an operating member, an electric actuator and an electronic controller. The operating member is provided to the support. The detector is configured to detect information on input to the operating member. The electric actuator is configured to drive the brake apparatus. The electronic controller is configured to control the electric actuator based on a detection result of the detector. With the brake operating apparatus according to the first aspect, the electric actuator is driven by the electronic controller based on input to the operating member, and the brake apparatus is driven. Therefore, the existing brake apparatus can be driven by electric power in accordance with human input.

In accordance with a second aspect, in the brake operating apparatus according to the first aspect, at least one of the electronic controller and the electric actuator is provided to the support. With the brake operating apparatus according to the second aspect, the brake operating apparatus can be made compact.

In accordance with a third aspect, in the brake operating apparatus according to the first aspect, both of the electronic controller and the electric actuator are provided to the support. With the brake operating apparatus according to the third aspect, the brake operating apparatus can be made compact.

In accordance with a fourth aspect, the brake operating apparatus according to any one of the first to third aspects further comprises a conversion mechanism configured to convert power of the electric actuator into a driving force for the brake apparatus. With the brake operating apparatus according to the fourth aspect, the existing brake apparatus can be readily driven without adding a new configuration to the existing brake apparatus.

In accordance with a fifth aspect, in the brake operating apparatus according to the fourth aspect, the conversion mechanism includes a hydraulic unit including a base, a cylinder bore provided to the base, and a piston movable in the cylinder bore. With the brake operating apparatus according to the fifth aspect, the conversion mechanism converts power of the electric actuator into a hydraulic pressure to efficiently, thereby smoothly driving the existing brake apparatus.

In accordance with a sixth aspect, in the brake operating apparatus according to the fifth aspect, the hydraulic unit further comprises a reservoir fluidly coupled to the cylinder bore. With the brake operating apparatus according to the sixth aspect, a proper amount of hydraulic oil in the path can be kept.

In accordance with a seventh aspect, in the brake operating apparatus according to the fifth or sixth aspect, the hydraulic unit is provided to the support. With the brake operating apparatus according to the seventh aspect, the brake operating apparatus can be made compact.

In accordance with an eighth aspect, in the brake operating apparatus according to the seventh aspect, the base is integrated with the support. With the brake operating apparatus according to the eighth aspect, the brake operating apparatus can be made compact.

In accordance with a ninth aspect, in the brake operating apparatus according to any one of the first to eighth aspects, the operating member is pivotable around a pivot axis relative to the support from a rest position to an operated position. The brake operating apparatus according to the ninth aspect can provide the user with an operational feeling similar to that of a brake operating apparatus configured to drive the brake apparatus by human power.

In accordance with a tenth aspect, in the brake operating apparatus according to the ninth aspect, the detector is configured to detect a displacement of the operating member from the rest position to the operated position. The brake operating apparatus according to the tenth aspect can provide the user with an operational feeling similar to that of a brake operating apparatus configured to drive the brake apparatus by human power.

In accordance with an eleventh aspect, in the brake operating apparatus according to the tenth aspect, the detector includes a rotational detection sensor. The brake operating apparatus according to the eleventh aspect can provide the user with an operational feeling similar to that of a brake operating apparatus configured to drive the brake apparatus by human power.

In accordance with a twelfth aspect, in the brake operating apparatus according to any one of the first to eleventh aspects, the detector is configured to detect a force applied to the operating member. With the brake operating apparatus according to the twelfth aspect, the brake apparatus is driven in accordance with a force applied to the operating member, thereby providing a desired braking force. When the operating member is not displaced, the burden of the user's operation can be alleviated.

In accordance with a thirteenth aspect, in the brake operating apparatus according to the twelfth aspect, the detector includes a strain sensor. With the brake operating apparatus according to the thirteenth aspect, the force applied to the operating member can be readily detected.

To solve the foregoing problem and achieve the object, in accordance with a fourteenth aspect of the present invention, a brake system includes the brake operating apparatus according to any one of the first to thirteenth aspects; and the brake apparatus operatively coupled to the electric actuator. With the brake system according to the fourth aspect, the electric actuator is driven by the electronic controller based on input to the operating member, and the brake apparatus is driven. Therefore, the existing brake apparatus can be driven by electric power in accordance with human input.

According to the present invention, the existing brake apparatus can be driven by electric power.

BRIEF DESCRIPTION OF THE DRAWINGS

Referring now to the attached drawings which form a part of this original disclosure.

DETAILED DESCRIPTION OF EMBODIMENTS

Figure 1:
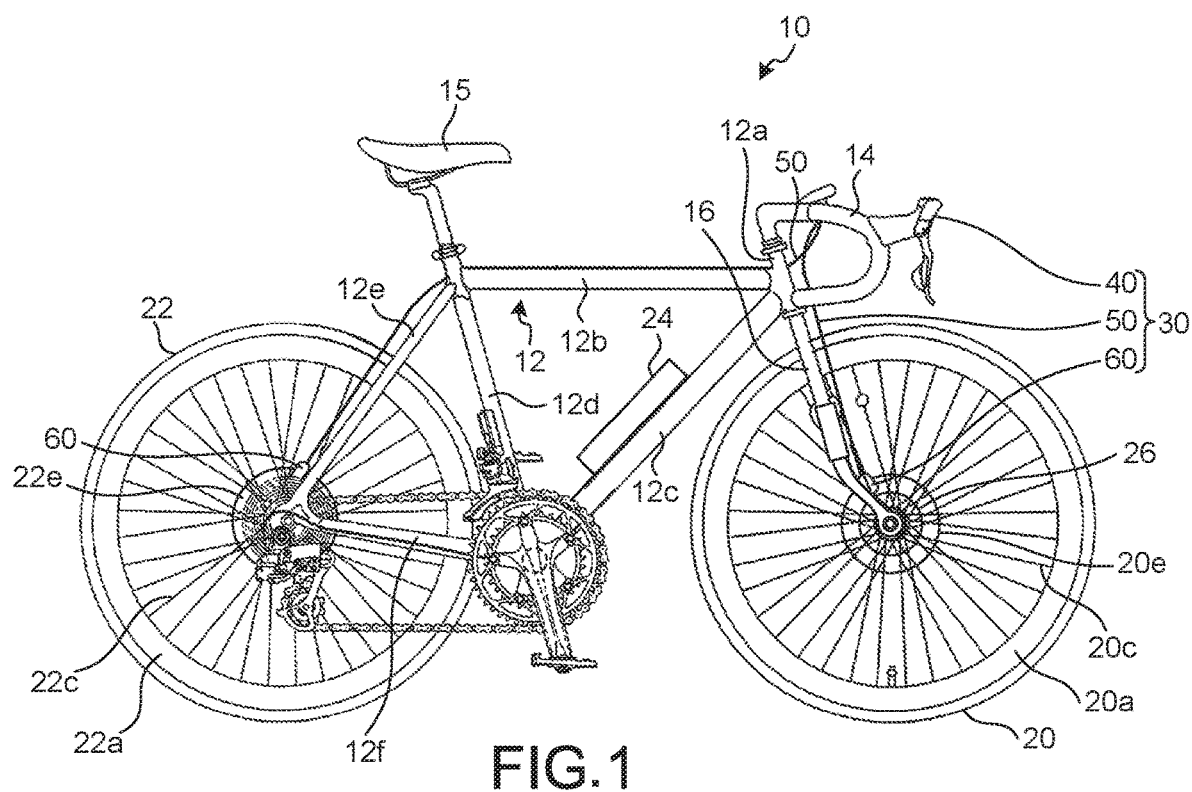
FIG. 1 is a side elevational view of a small vehicle (bicycle) equipped with a brake operating apparatus according to one illustrated embodiment.

A preferred embodiment of the present invention will be described in detail below with reference to the accompanying drawings. It should be noted that the present invention is not limited to the embodiment. When several embodiments are available, any combination of the embodiments also falls within the scope of the present invention. For example, the present embodiment describes a case in which a small vehicle is a bicycle, but the present invention can also be applied to other vehicles driven by human power. The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

A small vehicle 10 in the present embodiment means a vehicle at least partially using human power for motive power for traveling and includes a vehicle using electric power to assist human power. The small vehicle 10 includes a vehicle that does not require a license on a public road. The small vehicle 10 does not include a vehicle solely using motive power other than human power. The small vehicle 10 does not include a vehicle having an internal combustion engine. The small vehicle 10 is, for example, a bicycle. The small vehicle 10 may be an electrically assisted bicycle (e-bike). The small vehicle 10 includes a frame 12, a handlebar 14, a saddle 15, a fork 16, a front wheel 20, a rear wheel 22, a battery 24, an electric generator mechanism 26, and a brake system 30. In the present embodiment, "front", "rear", "left", "right", "upper", and "lower", and terms with equivalent meaning mean "front", "rear", "left", "right", "upper", and "lower" as viewed in a state in which the user, facing the handlebar 14, sits on the saddle 15.

As illustrated in FIG. 1, the frame 12 includes a head tube 12a, a top tube 12b, a down tube 12c, a seat tube 12d, a pair of seat stays 12e, and a pair of chain stays 12f. The head tube 12a supports the handlebar 14 and the fork 16 such that they are rotatable. One end of the top tube 12b is connected to the head tube 12a, and the other end is connected to the seat tube 12d. One end of the down tube 12c is connected to the head tube 12a, and the other end is connected to the seat tube 12d. One end of each of a pair of seat stays 12e is connected to the seat tube 12d and the other end is connected to the chain stay 12f. One end of each of a pair of chain stays 12f is connected to the seat tube 12d, and the other end is connected to the seat stay 12e. FIG. 1 illustrates the seat stay 12e and the chain stay 12f on the right side.

The handlebar 14 is configured to be gripped by the rider (user) of the small vehicle 10. The handlebar 14 is rotatable relative to the head tube 12a. The handlebar 14 is rotated whereby the fork 16 rotates to change the traveling direction of the small vehicle 10.

As illustrated in FIG. 1, the front wheel 20 is attached to the fork 16 so as to be rotatable. The front wheel 20 includes a rim 20a to which a tire is attached, a plurality of spokes 20c, and a disc rotor 20e. The rear wheel 22 is attached to the rear end where the seat stays 12e are connected with the chain stays 12f. The rear wheel 22 is rotatable relative to the frame 12. The rear wheel 22 includes a rim 22a to which a tire is attached, a plurality of spokes 22c, and a disc rotor 22e.

The battery 24 is a rechargeable battery (secondary battery). As illustrated in FIG. 1, the battery 24 is attached to, for example, the down tube 12c. The battery 24 is connected to components of the small vehicle 10 including the brake system 30 to supply electric power to these components.

The electric generator mechanism 26 generates electric power by the operation of the small vehicle 10. As illustrated in FIG. 1, the electric generator mechanism 26 is provided, for example, on the front wheel 20. The electric generator mechanism 26 can be provided on the rear wheel 22. The electric generator mechanism 26 is a dynamo (hub dynamo) that generates electric power with rotation of the front wheel 20. The electric generator mechanism 26 supplies the generated electric power to the battery 24.

As illustrated in FIG. 1, the brake system 30 includes a brake operating apparatus 40, a connecting member 50, and a brake apparatus 60. Here, the brake system 30 includes two of the brake operating apparatuses 40, two of the connecting members 50, and two of the brake apparatuses 60. One of the brake operating apparatuses 40, one of the connecting members 50, and one of the brake apparatuses 60 are provided to the front wheel 20, and the other one of the brake operating apparatuses 40, the other one of the connecting members 50, and the other one of the brake apparatuses 60 are provided to the rear wheel 22.

Figure 2:
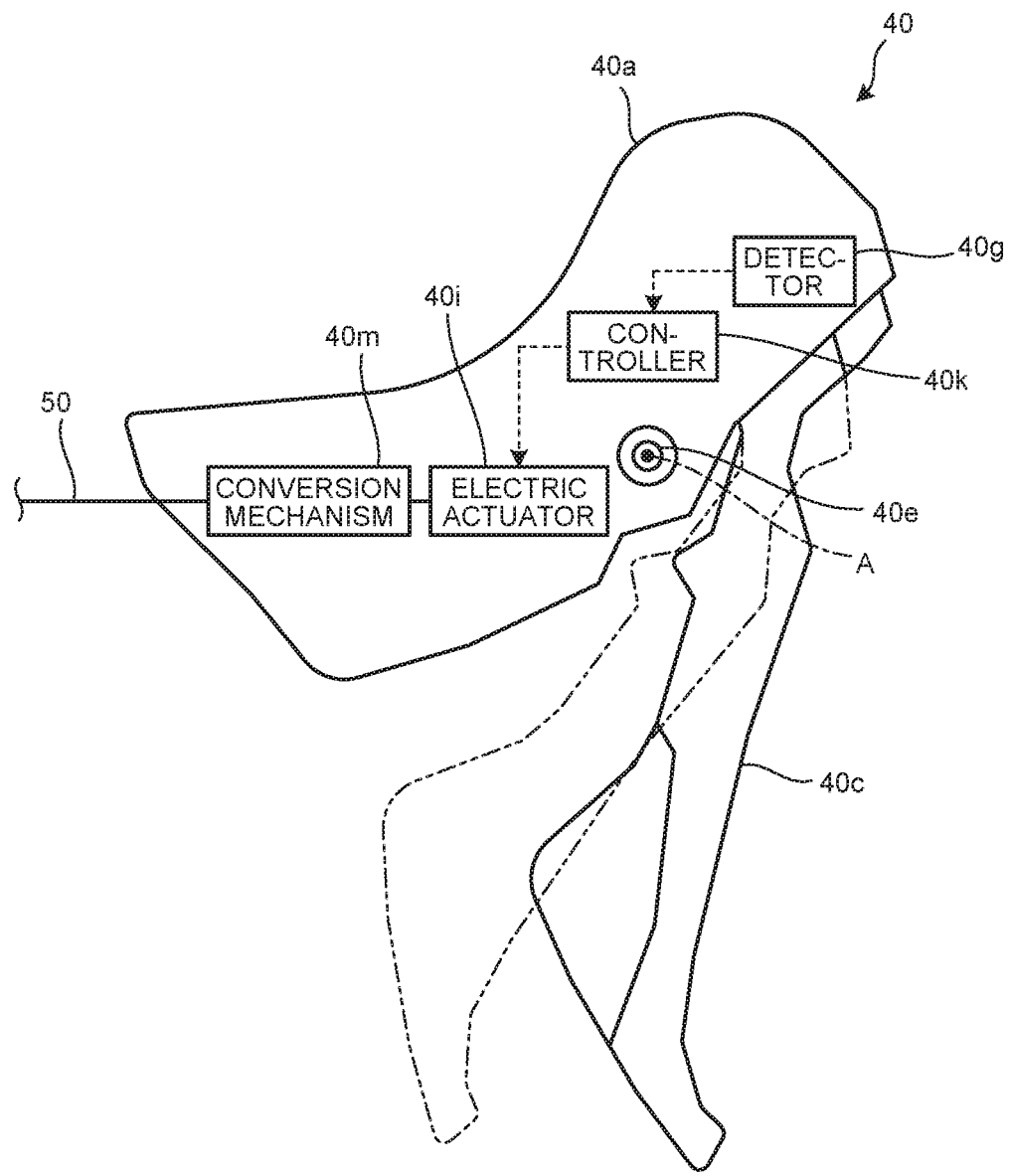
FIG. 2 is a schematic diagram of the brake operating apparatus in accordance with the illustrated embodiment.

As illustrated in FIG. 1, the brake operating apparatuses 40 are provided on the handlebar 14. One of the brake operating apparatuses 40 is provided at one end of the handlebar 14. The other brake operating apparatus 40 is provided at the other end of the handlebar 14. FIG. 1 illustrates the brake operating apparatus 40 on the right side. The brake operating apparatus 40 operates the brake apparatus 60 of the small vehicle 10 including a bicycle. As illustrated in FIG. 2, the brake operating apparatus 40 includes a support 40a, an operating member 40c, a pivot 40e, a detector 40g, an electric actuator 40i, an electronic controller 40k, and a conversion mechanism 40m.

The support 40a is provided on the handlebar 14. The support 40a has a storage space in the inside thereof for storing the detector 40g, the electronic controller 40k, the electric actuator 40i, and the like. At least one of the electronic controller 40k and the electric actuator (e.g. electric motor) 40i is provided to the support 40a. In the present embodiment, both the electronic controller 40k and the electric actuator 40i are provided to the support 40a. The support 40a contains the pivot 40e, the detector 40g, the electric actuator 40i, the electronic controller 40k, and the conversion mechanism 40m.

The operating member 40c is provided to the support 40a. The operating member 40c is a user operable input device. The operating member 40c is provided so as to be pivotable around a pivot axis A relative to the support 40a from a rest position to an operated position. The pivot axis A is a virtual straight line passing through the center of the pivot 40e. The operating member 40c is a brake lever. The operating member 40c is not limited to the user operable input device of FIG. 2, and can include, for example, a button, a switch, a dial, etc. In FIG. 2, the operating member 40c in the rest position is illustrated by a solid line. In FIG. 2, the operating member 40c in the operated position is illustrated by a dashed and double-dotted line. For example, the operating member 40c is supported on the support 40a with an elastic member interposed therebetween. When a force is applied to the operating member 40c in the rest position, the operating member 40c moves to the operated position against the elastic force of the elastic member. When the operating member 40c is released, the operating member 40c returns to the rest position by the elastic force of the elastic member. The operated position is not limited to the position illustrated in FIG. 2. The operated position in FIG. 2 is illustrated by way of example. The term "rest position" as used herein refers to a state in which a movable part (e.g., the operating member 40c) remains stationary without the need of a user or other external force intervening (e.g., holding the operating member 40c) to establish a state corresponding to the rest position. Thus, the term "rest position" can also be referred to as a non-operated position.

The detector 40g is configured to detect information on input to the operating member 40c. For example, the detector 40g is configured to detects a displacement of the operating member 40c from the rest position to the operated position. The displacement of the operating member 40c includes a rotational angle, a rotational speed, and a rotational acceleration of the operating member 40c. The detector 40g includes a rotational detection sensor. The detector 40g converts a displacement of the operating member 40c into an electrical signal and outputs the electrical signal to the electronic controller 40k. The detector 40g can detect a force applied to the operating member 40c. The detector 40g includes a strain sensor that is arranged to detect a force applied to the operating member 40c. Examples of the strain sensor include piezoelectric element and magnetostrictive sensor. In this case, the detector 40g converts a force applied to the operating member 40c into an electrical signal and outputs the electrical signal to the electronic controller 40k. The detector 40g can detect relative movement of the operating member 40c with respect to the support 40a. The detector 40g includes a displacement sensor that is arranged to detect movement of the operating member 40c with respect to the support 40a. Examples of the displacement sensor include a Hall element and a magnetic reed of a reed switch. The detector 40g can be configured with a combination of a displacement sensor for detecting a displacement of the operating member 40c and a force sensor for detecting a force input to the operating member 40c. If only a force sensor is used as the detector 40g, then displacement of the operating member 40c with respect to the support 40a is detected based a force input to the operating member 40c.

The electric actuator 40i is a device for driving the brake apparatus 60. The electric actuator 40i includes, for example, a case provided to the support 40a, a stator provided to the case, and a rotor configured to rotate relative to the stator. Thus, the electric actuator 40i can be an electric motor. Electric power from the battery 24 is supplied to the electric actuator 40i.

The electronic controller 40k is configured to control the electric actuator 40i based on a detection result of the detector 40g. The electronic controller 40k is preferably a microcomputer and includes, for example, a central processing unit (CPU), an electronic control unit (ECU), a read only memory (ROM), a random access memory (RAM), and a flash memory. In other words, for example, the electronic controller 40k is a microcomputer that includes one or more processors and one or more computer storage devices (i.e., computer memory devices). The electronic controller 40k is formed of one or more semiconductor chips that are mounted on a printed circuit board. The term "electronic controller" as used herein refers to hardware that executes a software program, and does not include a human. These components cooperate with each other to implement the functions of the electronic controller 40k. Electric power from the battery 24 is supplied to the electronic controller 40k. The electronic controller 40k outputs a control signal to the electric actuator 40i, at least based on an electrical signal from the detector 40g. The electronic controller 40k can output a control signal to the electric actuator 40i, based on an electrical signal from the detector 40g and an electrical signal from another sensor. For example, another sensor is a sensor that detects a rotational speed of the front wheel 20 or the rear wheel 22.

Figure 3:
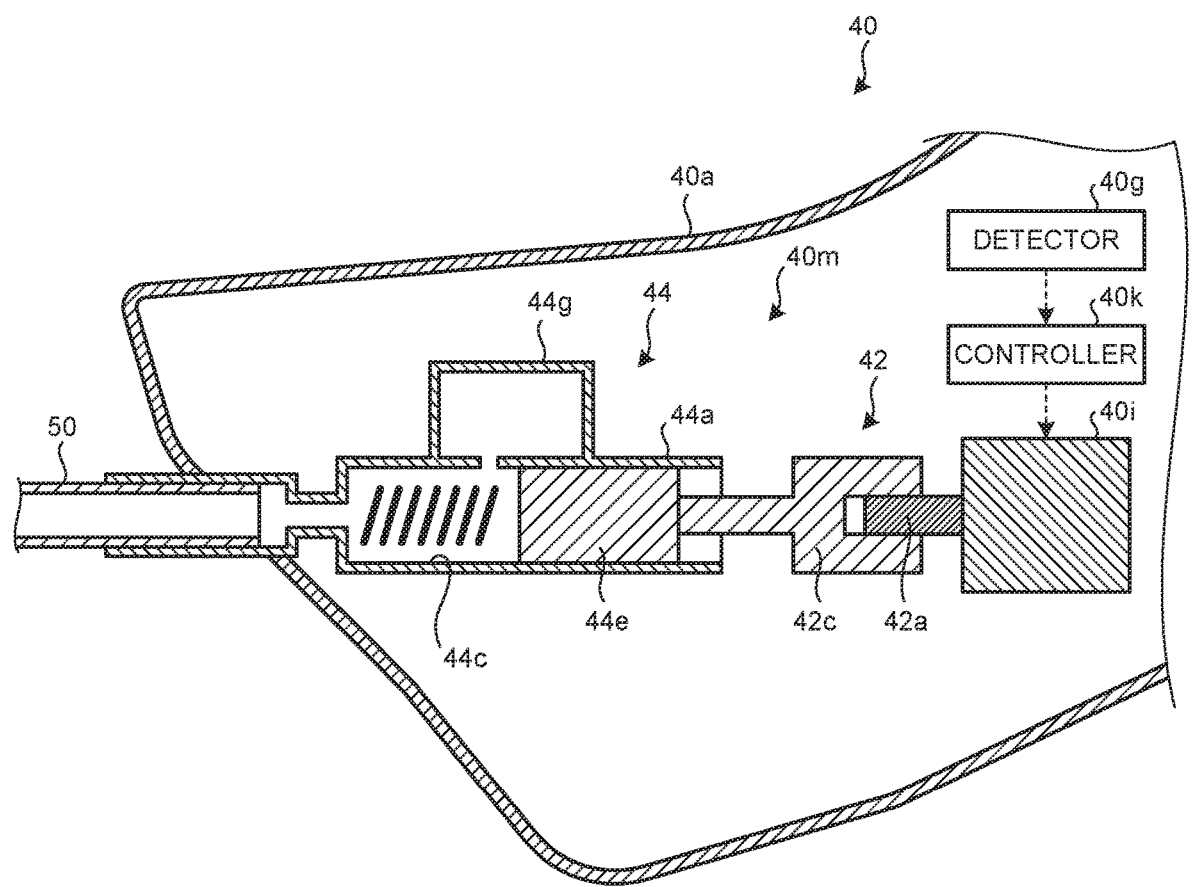
FIG. 3 is a schematic cross-sectional view of the brake operating apparatus illustrated in FIG. 2 in accordance with the illustrated embodiment.

The conversion mechanism 40m converts the power of the electric actuator 40i into a driving force for the brake apparatus 60. The conversion mechanism 40m converts rotational motion into linear motion and converts linear motion into hydraulic pressure. As illustrated in FIG. 3, the conversion mechanism 40m includes a ball screw 42 and a hydraulic unit 44. The ball screw 42 includes a threaded shaft 42a and a nut 42c. The threaded shaft 42a is connected to the rotor of the electric actuator 40i. The threaded shaft 42a rotates together with the rotor of the electric actuator 40i. The nut 42c meshes with the threaded shaft 42a. When the threaded shaft 42a rotates, the nut 42c moves in the axial direction. Here, the conversion mechanism 40m is a power transmission, and more particularly, a mechanical power transmission.

As illustrated in FIG. 3, the hydraulic unit 44 is provided to the support 40a. The hydraulic unit 44 includes a base 44a, a cylinder bore 44c, a piston 44e, and a reservoir 44g. The base 44a is a hollow tubular member. The cylinder bore 44c is provided to the base 44a. The piston 44e is provided so as to be movable in the cylinder bore 44c. The cylinder bore 44c is filled with hydraulic oil. The piston 44e is connected to the nut 42c. When the nut 42c moves in the axial direction with the drive of the electric actuator 40i, the piston 44e moves in the inside of the cylinder bore 44c. The hydraulic oil in the cylinder bore 44c is thus supplied to the brake apparatus 60, so that the front wheel 20 or the rear wheel 22 is braked. The reservoir 44g is fluidly coupled to the cylinder bore 44c. That is, the reservoir 44g and the cylinder bore 44c communicate with each other such that the hydraulic oil that is a fluid can circulate. The reservoir 44g is provided on the base 44a. The reservoir 44g stores therein hydraulic oil to allow the hydraulic oil to circulate between the cylinder bore 44c and the reservoir 44g in accordance with the position of the piston 44e.

The connecting member 50 is a member that connects the brake operating apparatus 40 with the brake apparatus 60. The connecting member 50 is a hose. The connecting member 50 is connected to the hydraulic unit 44 of the conversion mechanism 40m. The inside of the connecting member 50 is filled with hydraulic oil that is a power transmission medium. The connecting member 50 transmits a change in hydraulic pressure in the hydraulic unit 44 to the brake apparatus 60.

Figure 4:
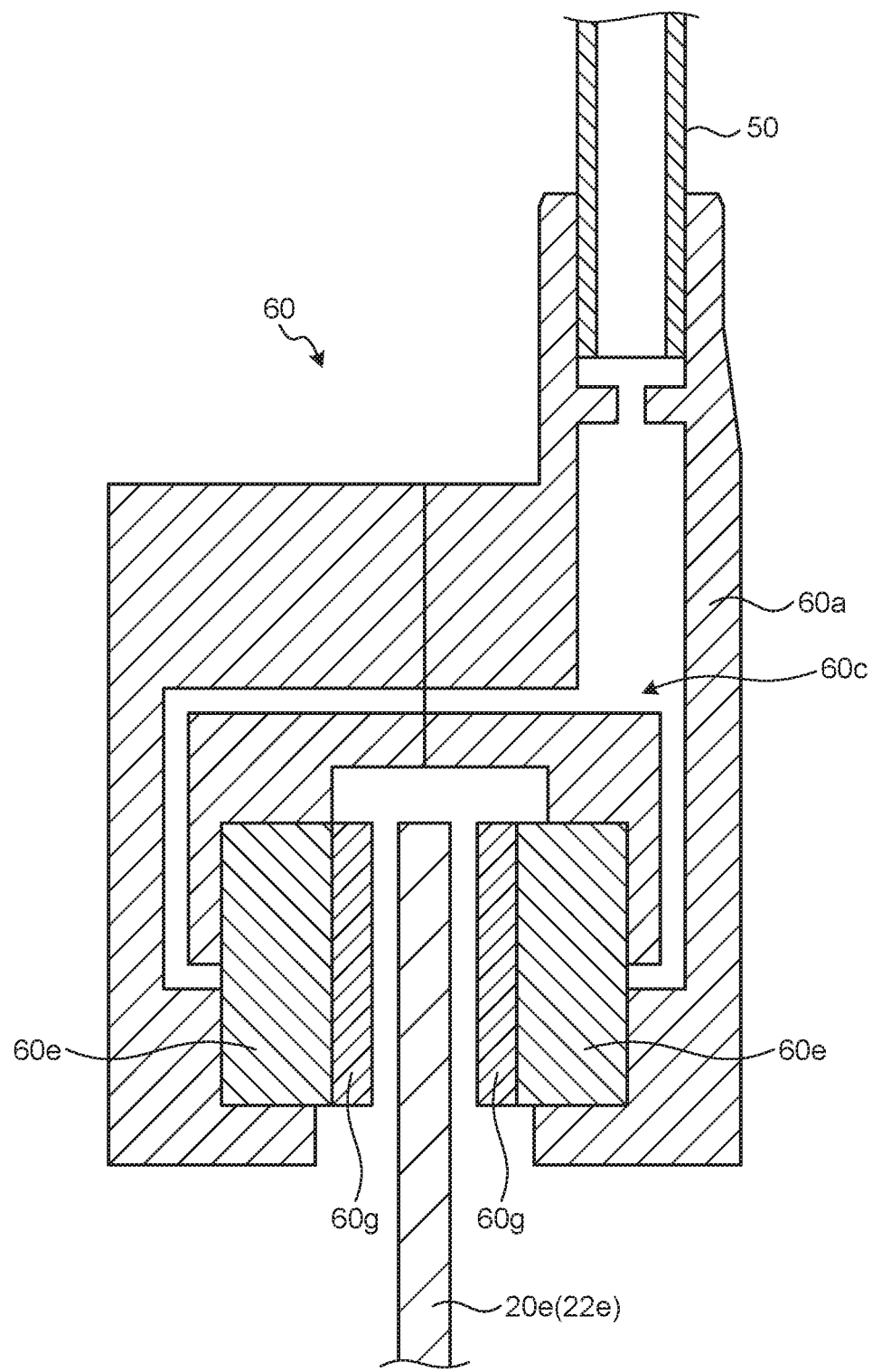
FIG. 4 is a simplified cross-sectional view of a brake apparatus of a brake system in the illustrated embodiment.

As illustrated in FIG. 4, the brake apparatus 60 includes a base 60a, a channel 60c, pistons 60e, and friction members 60g. In the present embodiment, the brake apparatus 60 has two pistons 60e. One of the two pistons 60e can be eliminated or may be fixed to the base 60a. In the brake apparatus 60 corresponding to the front wheel 20, the base 60a is provided on the fork 16. In the brake apparatus 60 corresponding to the rear wheel 22, the base 60a is provided on the seat stays 12e. The channel 60c is provided to the base 60a. The piston 60e is slidable relative to the base 60a. The friction member 60g serving as a brake pad is movably supported on the base 60a through a not-illustrated pad pin.

When the operating member 40c of the brake operating apparatus 40 moves from the rest position to the operated position, the detector 40g detects a displacement of the operating member 40c. The detector 40g outputs information on a displacement of the operating member 40c to the electronic controller 40k. The electronic controller 40k controls the electric actuator 40i, based on the information obtained from the detector 40g. The power of the electric actuator 40i is converted into a hydraulic pressure by the conversion mechanism 40m. The connecting member 50 transmits a change in hydraulic pressure to the channel 60c of the brake apparatus 60. The change in the channel 60c causes the two pistons 60e and the two friction members 60g to move. The disc rotor 20e (disc rotor 22e) is then sandwiched between the two friction members 60g. The friction between the disc rotor 20e (disc rotor 22e) and the friction members 60g brakes rotation of the front wheel 20 (rear wheel 22).

The electric generator mechanism 26 can directly supply the generated electric power to other components of the small vehicle 10 including the brake system 30. The electronic controller 40k of the brake operating apparatus 40 can acquire electric power from the electric generator mechanism 26. Alternatively, the electronic controller 40k of the brake operating apparatus 40 can acquire electric power from both of the battery 24 and the electric generator mechanism 26. The small vehicle 10 need not include the electric generator mechanism 26 and can include the battery 24 alone as an electric power supply source. Alternatively, the small vehicle 10 need not include the battery 24 and can include the electric generator mechanism 26 alone as an electric power supply source.

The conversion mechanism 40m can include, instead of the hydraulic unit 44, a wire winding unit configured to wind (pull) the wire with the drive of the electric actuator 40i. In this case, the connecting member 50 is a Bowden cable including a wire. In this case, the tension of the connecting member 50 is transmitted to the brake apparatus 60, whereby the pistons 60e and the friction members 60g of the brake apparatus 60 move.

In the present embodiment, a disc brake caliper that brakes the disc rotor 20e (disc rotor 22e) has been described as the brake apparatus 60. However, the brake apparatus is not limited to this. A rim brake configured to sandwich the rim 20a (rim 22a) between the friction members can be used as the brake apparatus.

Modification

Figure 5:
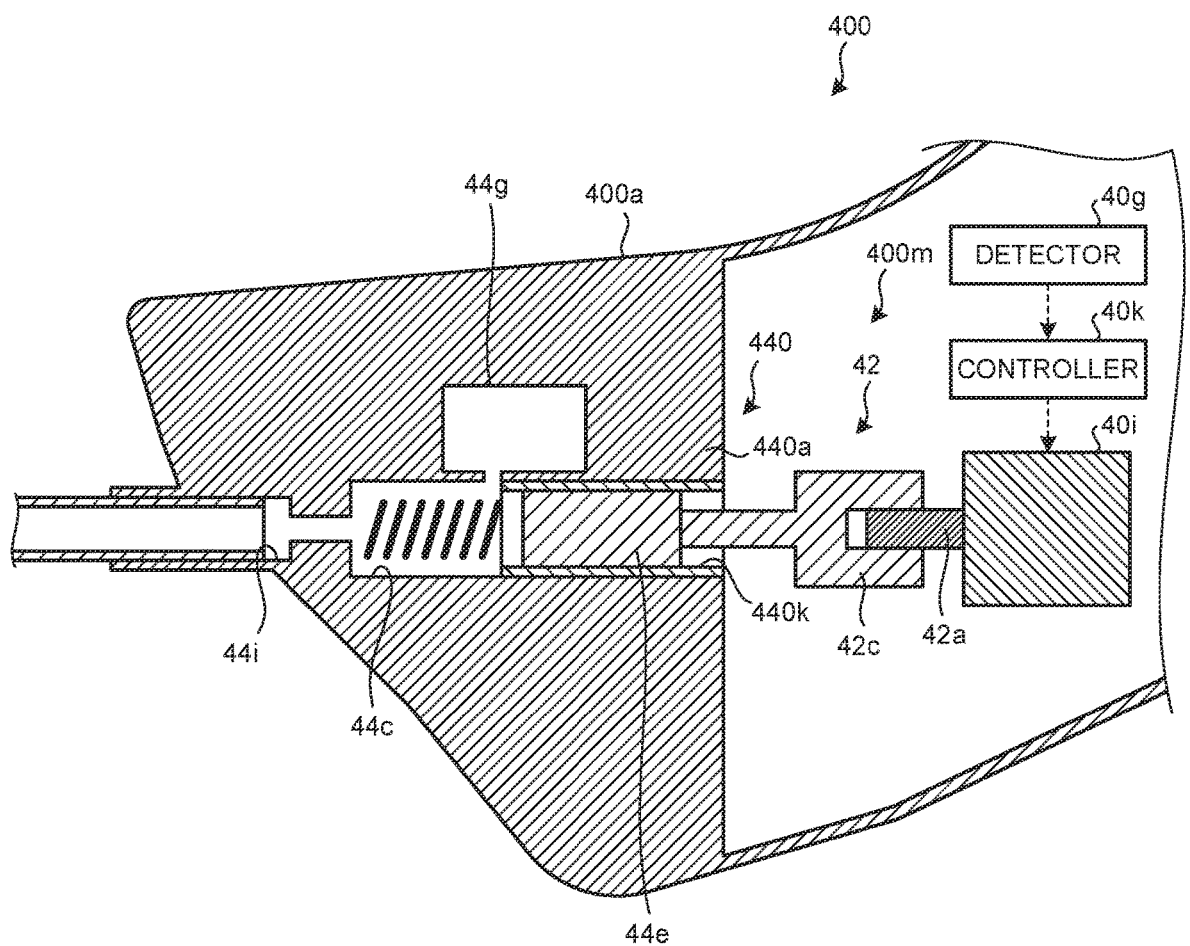
FIG. 5 is a cross-sectional view of a brake operating apparatus in accordance with a modification.

As illustrated in FIG. 5, a brake operating apparatus 400 in a modification includes a support 400a different from the foregoing support 40a and a conversion mechanism 400m different from the foregoing conversion mechanism 40m. The same configuration as that of the foregoing embodiment is denoted by the same reference sign and will not be further elaborated.

As illustrated in FIG. 5, the conversion mechanism 400m includes a hydraulic unit 440. The hydraulic unit 440 includes a base 440a and a sleeve 440k. The base 440a is integrated with the support 400a. For example, the base 440a and the support 400a are formed in one piece. The sleeve 440k is a hollow tubular member. The sleeve 440k is provided to the cylinder bore 44c. The sleeve 440k is disposed between the inner wall of the cylinder bore 44c and the piston 44e. The conversion mechanism 400m need not include the sleeve 440k.

While a certain embodiment and a modification of the present invention have been described, the description thereof is not intended to limit the embodiment. The constituting elements described herein include elements easily achieved by one skilled in the art, elements being substantially the same as the constituting elements, and elements within the scope of equivalents of the constituting elements. The constituting elements described herein may be combined in an appropriate manner. Furthermore, various omissions, substitutions and changes in the constituting elements may be made without departing from the spirit of the embodiment.

What is claimed is:

1. A brake operating apparatus for operating a brake apparatus of a small vehicle including a bicycle, the brake operating apparatus comprising:
   a support having a handlebar mounting part that is to be mounted to a handlebar of the bicycle;
   an operating member provided to the support;
   a detector configured to detect information on input to the operating member;
   an electric actuator configured to drive a piston of the brake apparatus along a longitudinal direction of the support, the longitudinal direction being non-parallel to a lengthwise direction of the handlebar, the electric actuator being provided to the support; and
   an electronic controller configured to control the electric actuator based on a detection result of the detector.

2. The brake operating apparatus according to claim 1, wherein
   both of the electronic controller and the electric actuator are provided to the support.

3. The brake operating apparatus according to claim 1, further comprising
   a conversion mechanism configured to convert power of the electric actuator into a driving force for the brake apparatus.

4. The brake operating apparatus according to claim 3, wherein
   the conversion mechanism includes a hydraulic unit including a base, a cylinder bore provided to the base, and a piston movable in the cylinder bore.

5. The brake operating apparatus according to claim 4, wherein
the hydraulic unit further includes a reservoir fluidly coupled to the cylinder bore.

6. The brake operating apparatus according to claim 4, wherein
the hydraulic unit is provided to the support.

7. The brake operating apparatus according to claim 6, wherein
the base is integrated with the support.

8. The brake operating apparatus according to claim 1, wherein
the operating member is pivotable around a pivot axis relative to the support from a rest position to an operated position.

9. The brake operating apparatus according to claim 8, wherein
the detector is configured to detect a displacement of the operating member from the rest position to the operated position.

10. The brake operating apparatus according to claim 9, wherein
the detector includes a rotational detection sensor.

11. The brake operating apparatus according to claim 1, wherein
the detector is configured to detect a force applied to the operating member.

12. The brake operating apparatus according to claim 11, wherein
the detector includes a strain sensor.

13. A brake system including the brake operating apparatus according to claim 1, and comprising:
the brake apparatus operatively coupled to the electric actuator.

14. The brake operating apparatus according to claim 1, further comprising
the piston, the piston being positioned closer to an outlet of the support than the electric actuator is positioned to the support.

15. The brake operating apparatus according to claim 14, wherein
the outlet of the support receives a hose that is in hydraulic communication with the piston to transmit hydraulic force from the brake operating apparatus to the brake apparatus.

16. The brake operating apparatus according to claim 15, wherein
the piston is positioned closer to the outlet of the support than the electronic controller is positioned to the support.

* * * * *